United States Patent [19]

Haas et al.

[11] 4,031,250

[45] June 21, 1977

[54] METHOD FOR IMPARTING RED COLOR TO ANIMAL FOOD

[75] Inventors: Gerhard Julius Haas, Woodcliff Lake, N.J.; Edwin Bernard Herman, Croton-on-Hudson; Joaquin Castro Lugay, Thornwood, both of N.Y.

[73] Assignee: General Foods Corporation, White Plains, N.Y.

[22] Filed: Nov. 20, 1974

[21] Appl. No.: 525,710

[52] U.S. Cl. .................................. 426/18; 426/540; 426/805
[51] Int. Cl.$^2$ ...................... A21D 2/00; A23K 1/18
[58] Field of Search .............. 426/18, 60, 177, 204, 426/262, 429, 805, 74, 430, 540, 250, 61; 195/53, 81, DIG. 3

[56] References Cited

UNITED STATES PATENTS

| | | |
|---|---|---|
| 3,202,514 | 8/1965 | Burgess et al. ........................ 426/74 |
| 3,380,832 | 4/1968 | Bone ................................... 426/262 |
| 3,765,906 | 10/1973 | Yamaguchi et al. ................. 426/18 |
| 3,911,141 | 10/1975 | Farr et al. ........................... 426/540 |

*Primary Examiner*—A. Louis Monacell
*Assistant Examiner*—C. A. Fan
*Attorney, Agent, or Firm*—Thaddius J. Carvis; Bruno P. Struzzi; Daniel J. Donovan

[57] ABSTRACT

An animal or pet food is prepared wherein a red, meaty color is imparted thereto by incorporation of an effective amount of the pigments produced by growth of *Monascus purpureus* on rice or corn.

9 Claims, No Drawings

METHOD FOR IMPARTING RED COLOR TO ANIMAL FOOD

BACKGROUND OF THE INVENTION

This invention relates to animal or pet foods and more particularly to the coloring of such foods to obtain a meaty, red color.

Animal or pet foods, whether they be of the dry; shelfstable intermediate-moisture; or canned variety are typically formulated so as to give the appearance of real meat in both color and texture. To achieve a meaty red color resort has been had to artificial coloring materials such as FD&C Red No. 2 or more recently FD&C Red No. 40 or Red No. 3. Consumer skepticism regarding such materials has led us to investigate other sources of raw meaty colors.

It is known in the prior art that rice acted upon by the mold Monascus purpureus becomes stained red by the mold. See, e.g., Hesseltine, A Millennium of Fungi, Food, and Fermentation, Mycologia, Vol. LVII, No. 2, 179–81 (1965); Lin, Isolation and Cultural Conditions of Monascus Sp. for the Production of Pigment in a Submerged Culture, J. Ferment. Technol., Vol 51, No. 6, 407–414 (1973). See also, U.S. Pat. No. 3,765,906. The thus stained rice has been used in the Orient for preparation of red rice wine. The use of a corn medium has also been tried. Palo, et al., A study on Ang-kak and its Production, Philippine J. Sci. 89: 1–22 (1961).

SUMMARY OF THE INVENTION

We have found that the pigments produced by the growth of *Monascus purpureus* on a material selected from the group consisting of rice, corn and mixtures thereof when added to an animal or pet food results in a surprisingly good raw meaty red color being imparted to the animal food. The use of such pigments is especially beneficial in a preferred embodiment wherein the treated rice or corn is finely-subdivided and used "as is" as the coloring material. The corn or rice thereby serves as a nutrient for the animal as well as a colorant.

In an alternate embodiment of the invention, the pigments produced are extracted from the corn or rice with a suitable organic solvent. Where the solvent is one having utility in pet foods such as propylene or butylene glycol or glycerol, this embodiment is especially unique in that the pigments can be added with the solvent to the animal food without the need for separation thereof.

DETAILED DESCRIPTION OF THE INVENTION

The primary object of this invention, namely, to impart a red meaty color to pet food through the use of natural coloring components is achieved in the following manner.

The basic starting material in the attainment of the natural coloring is a culture of the mold *Monascus purpureus* obtainable, for example, from the Western Regional Research Laboratories of the United States Department of Agriculture at Peoria, Ill. As obtained, the culture is typically carried on Sabourands agar slants. Potato dextrose agar is another suitable medium.

The mold is then used to inoculate either rice or corn. Preferably, the rice or corn is heated in a pretreatment step to temperatures sufficient to inactivate or kill microorganisms possibly present. Preferred in this respect is a simple autoclave process with temperatures typically in excess of 100° C, generally 121° C at 15 psi pressure for about 15 minutes. The amount of mold needed to stain a given batch of rice or corn a deep red color is not per se critical and is easily determinable by skilled art workers. Typically, a suspension of the mold in a liquid medium, for example water or isotonic saline, is first formed and then a suitable amount thereof is used to inoculate the rice or corn. By way of example, slants on which the organism has been grown are washed with about 9–10 mls. of water insuring that an adequate amount of mold material is brought into a visually turbid suspension. This suspension is added to a 50 gram batch of rice. As with other microorganisms, a preferred commercial embodiment utilizes the so treated rice or corn to inoculate further batches of such material.

A critical parameter in the inoculation process is the moisture present in the rice or corn/mold mixture. The preferred condition is to have water present in an amount sufficient to keep the rice or corn moist to the eye but not such that free excess water is apparent. Excess water has the effect of facilitating the growth of other molds and even bacteria, a particularly undesirable result. Utilization of less moisture than above-described is not detrimental to the growth except to prolong the time needed to fully stain the rice or corn or to inhibit the growth altogether. The presence of at least some moisture is, however, necessary.

Depending upon the amount of moisture, mold and the inoculation conditions, the thorough staining may take anywhere from a few days to 3 weeks. The conditions of temperature are not per se believed to be critical except insofar as affecting the rate of growth. The temperature should not be so excessive as to substantially inhibit growth of the microorganism or so high as to completely kill it. Preferred temperatures are in the ambient range, typically 20° to 25° C. The outer extremes for temperature conditions are believed well within the skill of the art.

The moisture requirement will typically require the intermittent addition of water to the rice or corn/mold mixture. In the initial stages of inoculation, heat-producing fermentation will be very active resulting in evaporation of the water. Hence, care must be taken at these early stages to retain moisture in the mix. As fermentation slows in the latter stages of inoculation, the moisture loss becomes less significant.

When the rice or corn has been suitably stained, it is heated to temperatures sufficient to kill the mold such temperatures typically in excess of about 100° C, more typically above 120° C. Again, an autoclave procedure is particularly suitable for this process.

The process from this point may take two different routes. In one especially suitable embodiment, the thus colored corn or rice is used as is to impart color to a pet or animal food. Thus an added advantage herein is that the coloring material makes a nutritional contribution to the food. In order to be compatible with the various food systems and to achieve as wide a dispersement of coloring material, the rice or corn is finely-divided prior to incorporation into the food. Any method of sub-division such as crushing, grinding, flaking may be used. A preferred particle size is smaller than about 40 microns typically achieved by pulverizing the rice or corn in a mill having a 40 micron screen. The amount of this finely-divided material is not critical and rather depends only upon the degree of color needed or desired. A typical amount for a meat-containing animal food is about 1–5% by weight. Larger amounts may be necessary where the animal food contains little or no meat as described hereinafter.

In an alternate embodiment, the red pigments of the rice or corn are extracted therefrom with a suitable solvent, preferably an organic solvent such as ethanol, propylene glycol, butylene glycol and the like. It is preferred though not essential to sub-divide the corn or rice as described above prior to extraction. The resultant solution of pigments may then be evaporated to dryness for use in the particular food formulation. Alternatively, where such solvents as propylene or butylene glycol are used, the pigment solution may be added with said materials, a particularly preferred embodiment where the glycols or other extracting material will comprise a portion of the final food product.

The present invention is applicable to the coloring of any animal food be it dry, soft-moist, or canned. Such foods are extremely well-known in the art as exemplified by the following patents:

Dry:
 U.S. Pat. No. 3,119,691 to Ludington et al.
 U.S. Pat. No. 3,365,297 to Burgess et al.
 British Pat. No. 1,312,910 to Baker et al. Complete Specification published Apr. 11, 1973
Intermediate-Moisture:
 U.S. Pat. No. 3,202,514 to Burgess et al.
 U.S. Pat. No. 3,380,832 to Bone
 British Pat. No. 1,290,811. Complete Specification published Sept. 27, 1972.
 U.S. Pat. No. 3,653,908 to Buck et al.
Canned:
 U.S. Pat. No. 3,574,633 to Flier The dry foods will typically have a moisture content below about 12% by weight, soft-moist or intermediate-moisture feeds between about 15 to 60% water; canned typically above 60 to 75% water. Various categories such as "semi-dry" or "soft-dry" have been used to describe products in the 10 to 25% moisture range.

The above-recited patents typically involve the use of meat, meat by-products or meat meal as a source component. However, the present invention is also applicable to and indeed is particularly applicable to products containing no meat since the coloring requirements are more pronounced in such foods. Typical of such products are totally grain-based products or products prepared from textured vegetable protein such as described in U.S. Pat. Nos. 3,488,770 to Atkinson; 3,496,858 to Jenkins.

The particular point at which the coloring material of this invention is incorporated with the animal food is not critical nor is the particular type food itself. Typically, the coloring material will be added as a source ingredient to the food mixture which may then be further processed such as by extrusion/cooking, forming, and the like. Where textured vegetable protein prepared by extrusion/expansion is used as a component of the foodstuff, it may be more desirable to add the coloring after extrusion, e.g. by infusion of a pigment solution or coating with the pigments. Dry foods prepared from farinaceous and proteinaceous materials are particularly suitable for use of the stained corn or rice "as is" where a meaty color is desired as well as soft-moist or canned products desirably containing a farinaceous ingredient.

A particularly preferred embodiment of this invention involves those foods where an organic solvent such a glycerol, other polyhydric alcohols, propylene or butylene glycol is employed as an ingredient thereof. In dry or semi-dry foods these solvents are particularly useful as texturizing humectants to obtain a moist/dry appearance and texture as well as to impart shelf-stability or microbiostasis to such products. Intermediate-moisture products make especial use of such materials as microbiostatic agents designed to lower the $A_w$ of such products (a measure of water availability for growth of microorganisms) to impart or aid shelf-stability. Use is typically in the 1 to 20% by weight range. Canned products may employ such ingredients to retain a moist texture and appearance. Textured protein products make use of such materials to impart plasticity to the protein mix and to aid or confer resistance to microbial contamination.

Where such products are to be colored, the stained rice or corn can be extracted with such solvents to remove the pigments therefrom and the pigment/solvent solution with or without dilution if needed is added as is to the particular formulation. Solvents not desirably present in the formula or not compatible with such formulas require evaporation prior to incorporation of the pigments to a food.

The following example illustrates the best mode of practicing this invention.

A culture of *Monascus purpureus* (Culture No. NRRL-2897) was obtained from the USDA Lab earlier mentioned. The culture was carried on Sabourauds agar slants (Difco). Nine mls. of water was used to wash the slant and the suspension was used to inoculate 50 grams of autoclaved (121° C) rice at room temperature (about 23° C). The rice was stained a deep red after about 16 days. This batch of rice was used to inoculate 500 grams of rice at room temperature, 300 mls. of water being added thereto. Water was added intermittently to keep the rice moist to the eye, yet avoiding excess water. After about 2 weeks the red rice was autoclaved (15 psig/121° C) and dried at about 100° C. The rice was pulverized in a mill with a 40 micron screen.

To an uncolored intermediate-moisture animal food made substantially in accordance with Example X of U.S. Pat. No. 3,202,514 to Burgess et al., was added about 3% by weight of the ground powders to color the product a meaty red color of approximately the same color and intensity as a control sample colored using FD&C colors.

In another example, 20 grams of the pulverized rice was extracted in a Soxhlet laboratory extraction apparatus using ethanol as the solvent. When evaporated to dryness, 3 grams of pigment were obtained having about 10% the color intensity of FD&C Red No. 3.

It will be appreciated that the various examples, conditions and the like are intended for illustrative purposes and that obvious variations and modifications may be made without departing from the scope and spirit of the invention as defined in the appended claims.

Having thus described our invention, what is claimed is:

1. A method for imparting a meaty red color to an animal food comprising culturing *Monascus Purpureus* on a material selected from the group consisting of rice, corn, and mixtures thereof to obtain red pigments thereon, subdividing said material containing said pigment to a finely-divided form, and adding said finely-divided material to an animal food in an amount effective to impart a red color to said food.

2. The method of claim 1 wherein the particle size of said finely-divided material is about 40 microns or less.

3. The method of claim 2 wherein said animal food is an intermediate-moisture, shelf-stable animal food.

4. The method of claim 2 wherein said animal food has a moisture content below about 12% by weight.

5. The method of claim 2 wherein said material is added to said food in an amount between about 1 to 5% by weight.

6. A method of imparting a meaty red color to intermediate-moisture animal foods comprising culturing *Monascus Purpureus*, a material selected from the group consisting of rice, corn and mixtures thereof to obtain red pigments thereon, extracting said pigments with an organic solvent selected from the group consisting of glycerol, proplyene glycol and butylene glycol, and adding said pigments with said organic solvent to an animal food in an amount sufficient to impart a red color to said food.

7. The method of claim 6 wherein the amount of said solvent added with said pigments is between about 1 to 20% by weight of said food.

8. The method of claim 7 wherein said solvent is propylene glycol.

9. A red meaty colored animal food comprised of edible nutritionally balanced ingredients selected from the group consisting of farinaceous material, proteinaceous material, and mixtures thereof, said farinaceous material comprising a finely-divided coloring material selected from the group consisting of rice, corn and mixtures thereof, which has been cultured with *Monascus purpureus* to impart a deep red coloration thereto, said finely-divided coloring material being present in an amount effective to impart a meaty red color to said animal food.

* * * * *